United States Patent [19]
D'Angelo

[11] 3,781,025
[45] Dec. 25, 1973

[54] RECIPROCATING SAW CHUCK
[76] Inventor: Nicola D'Angelo, 41 Washington St., Norwich, Conn. 06360
[22] Filed: Feb. 1, 1972
[21] Appl. No.: 222,573

[52] U.S. Cl.......................... 279/83, 30/392, 83/698
[51] Int. Cl............................................ B23b 31/10
[58] Field of Search ............... 279/83; 30/394, 392, 30/329, 393, 273; 83/698

[56] References Cited
UNITED STATES PATENTS
| | | | |
|---|---|---|---|
| 3,691,883 | 9/1972 | Ingram | 279/83 |
| 3,080,897 | 3/1963 | Winter | 30/394 |
| 3,097,430 | 7/1963 | Lewinski et al. | 30/392 X |

FOREIGN PATENTS OR APPLICATIONS
481,157  2/1952  Canada.................................. 30/392

OTHER PUBLICATIONS
American Machinist, (Collet Chuck by Hawes), Nov. 17, 1921, Page 815

Primary Examiner—Gil Weidenfeld
Attorney—Albert C. Hodgson

[57] ABSTRACT

A chuck for flat saw blades to be mounted on reciprocating shafts of the sabre saw type and having two set screws on opposite sides of the chuck and longitudinally spaced from each other to force a slight "S" bend in the saw blade.

2 Claims, 3 Drawing Figures

PATENTED DEC 25 1973　　　　　　　　　　　　　　　　　3,781,025
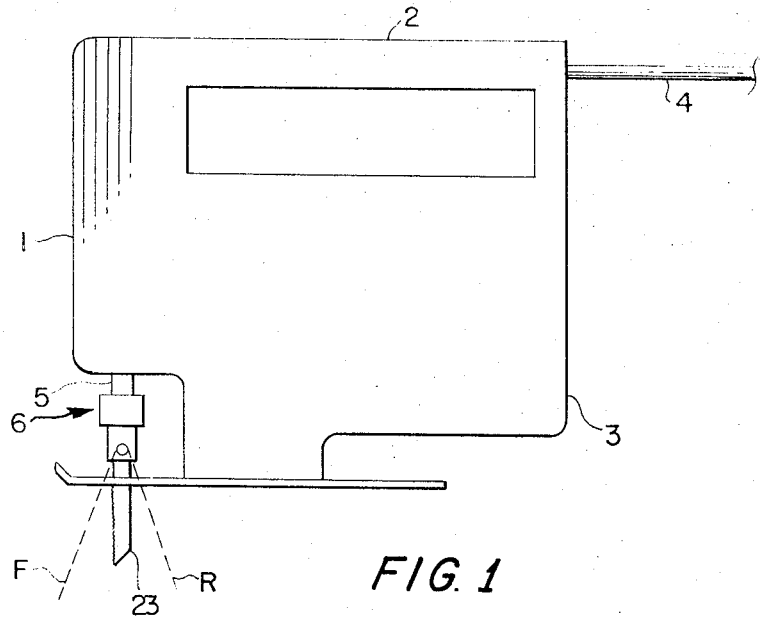
FIG. 1
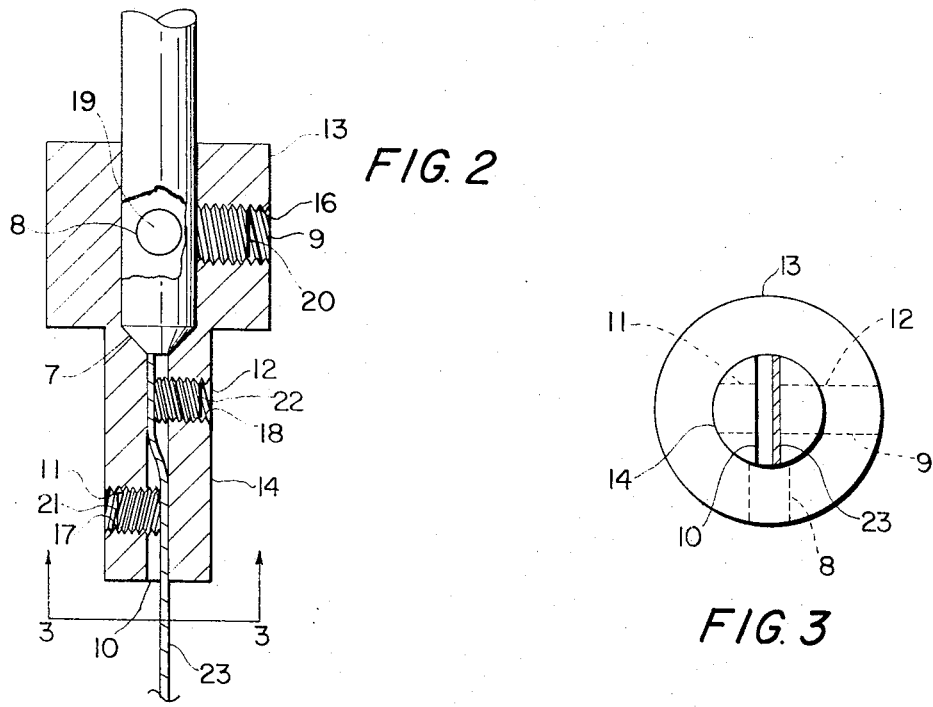
FIG. 2
FIG. 3

RECIPROCATING SAW CHUCK

BACKGROUND OF THE INVENTION

The present invention relates to chucks for sabre saws and is concerned, more particularly, with an adapter for mounting saw blades on reciprocating shafts at various angles with the axis of reciprocation.

BRIEF DESCRIPTION OF THE PRIOR ART

Prior chucks for reciprocating hand saws have used fittings with set screw to lock on the shaft and to bind the blade in a slot in the body of the chuck. Plural set screws including right-angle screws bearing on the flat of the blade and on the edge of the blade have been used in an attempt to gain a reliable lock of the blade in the fitting.

However, none of the prior blade mounts have been found to be entirely satisfactory. Many require exact clearances in machining the recess for the blade and are limited in the angle at which the blade may be mounted with respect to the shaft. Most of the prior units simply do not provide a secure mount for the blades, resulting in breakage of the blades, damage to workpieces and injury to the user.

SUMMARY OF THE INVENTION

In general, the preferred form of the present invention provides a chuck fitting having a bore for receiving the driven saw shaft, a slot for receiving the saw blade to be driven, and means for locking the fitting against both the shaft and the blade. The blade lock includes a pair of set screws extendable in opposite directions against the blade and spaced from each other longitudinally of the fitting and the blade to produce an "S" curve in the lock portion of the blade.

BRIEF DESCRIPTION OF THE DRAWINGS

A better understanding of the invention may be derived from the following description and the accompanying drawings, in which- FIG. 1 is a side view of a reciprocating hand saw embodying the invention;

FIG. 2 is a sectional view, on an enlarged scale, of the blade mount of FIG. 1; and FIG. 3 is a view taken on lines 3—3 of FIG. 1.

DESCRIPTION OF THE PREFERRED EMBODIMENT

As shown in the drawings, the preferred form of the invention comprises a portable, electrical jig-saw or reciprocating saw 1 including a handle 2, a motor frame 3 and a power chord 4. The motor frame encloses a conventional motor and drive (not shown) which provide reciprocation of a shaft 5 in a suitable working stroke typical of such saws.

As best shown in FIG. 2 and FIG. 3, the shaft 5 is provided with a blade mount or chuck 6 formed as a generally cylindrical member. At the shaft end, the chuck 6 has a bore 7 sized to receive the shaft 5 thereinto and has a pair of radial bores 8 and 9 extending at right angles to the bore 7 and at right angles to each other, so that they are spaced 90 degrees from each other about the circumference of the chuck.

At the end opposite from the bore 7, the chuck 6 has a slot 10 extending diametrically across the longitudinal axis of the chuck and extending lengthwise of the chuck a substantial distance. A pair of bores 11 and 12 extend radially inwardly to intersect the slot 10 at right angles with respect to the slot. The bores 11 and 12 are positioned on opposite sides of the slot 10 and are spaced from each other longitudinally of the chuck body.

As shown, the chuck 6 is formed in two diameters with the larger diameter section 13 encompassing the bore 7 and the smaller diameter section 14 carrying the slot 10. It is to be understood, however, that the exterior shape or dimensions of the chuck are not critical to my invention.

The radial bores 8, 9, 11, and 12 each are provided with helically threaded areas 15, 16, 17, and 18, respectively, into which are threaded set screws 19, 20, 21, and 22, respectively. The set screws may take any form desired, but I prefer the standard, hardened-tip, hexagonally driven screws of the type shown.

OPERATION OF THE PREFERRED EMBODIMENT

In use, the saw 1 is connected to a suitable source of current via the chord 4, but preferably is not so connected during assembly or adjustment.

The chuck 6 is secured upon the reciprocating shaft 5 by turning the set screws 19 and 20 inwardly until they lock on the shaft 5.

A saw blade 23 is inserted into the slot 10 and positioned at the angle desired, and is held in that position while the set screws 21 and 22 are turned inwardly against the blade 23. The set screws should be turned in approximately equally so that they impose approximately equal locking forces on the blade 23.

In this arrangement, the blade is structurally distorted a slight amount, taking an S-shape in the region of the set screws 21 and 22 (shown slightly exaggerated in FIG. 2). This structural deformation is of particular importance, since such blades typically are case-hardened or surface-hardened, for reasons of wear, and do not provide a surface which can be locally distorted by the noses of the set screws. Prior blade locking suffered in reliability because of this surface hardness of the blades.

The structural deformation of the blade by and between the set screws and the walls of the slot 10 provides a lock sufficiently secure as to permit the use of blades at "off" angles, or angles other than directly parallel to the axis of reciprocation. Previously, off angles required the use of different chucks with different angle abutments or shoulders against which the blade was locked. In contrast, the chuck of my invention is sufficiently reliable and versatile to permit the blades to be used therein at forward or rearward angles, if the slot is installed in a position parallel to the longitudinal axis of the saw 1, and at any angle, within the plane of the slot, at which the set screws are effective to bear against and deflect the shank of the blade into the S. Examples of such angles are represented in FIG. 1 by dotted lines F, as a forward angle, and R as a rearward angle.

Various changes may be made in the details of the invention as described without sacrificing the advantages thereof or departing from the scope of the appended claims.

I claim:

1. A chuck for mounting a flat saw blade to a reciprocating shaft of a power saw said chuck having
   an axial bore at one end, means for locking the reciprocating shaft in said axial bore, said chuck having at its opposite end, a substantially rectangular slot diametrically crossing the center of the chuck and extended along said chuck toward said axial bore, said slot being adapted to receive the shank of the saw blade therein, and blade locking means at said slot to direct locking forces on opposite sides of said blade and at points longitudinally spaced along said chuck for clamping at least two portions of said blade against opposed walls of said slot, whereby an offset in the blade is formed between said locking forces.

2. The apparatus of claim 1, in which the blade locking means includes at least a pair of threaded bores on opposite sides of the slot and at right angles to the slot, said threaded bores being longitudinally spaced from each other along said chuck, and a set screw in each threaded bore.

* * * * *